UNITED STATES PATENT OFFICE.

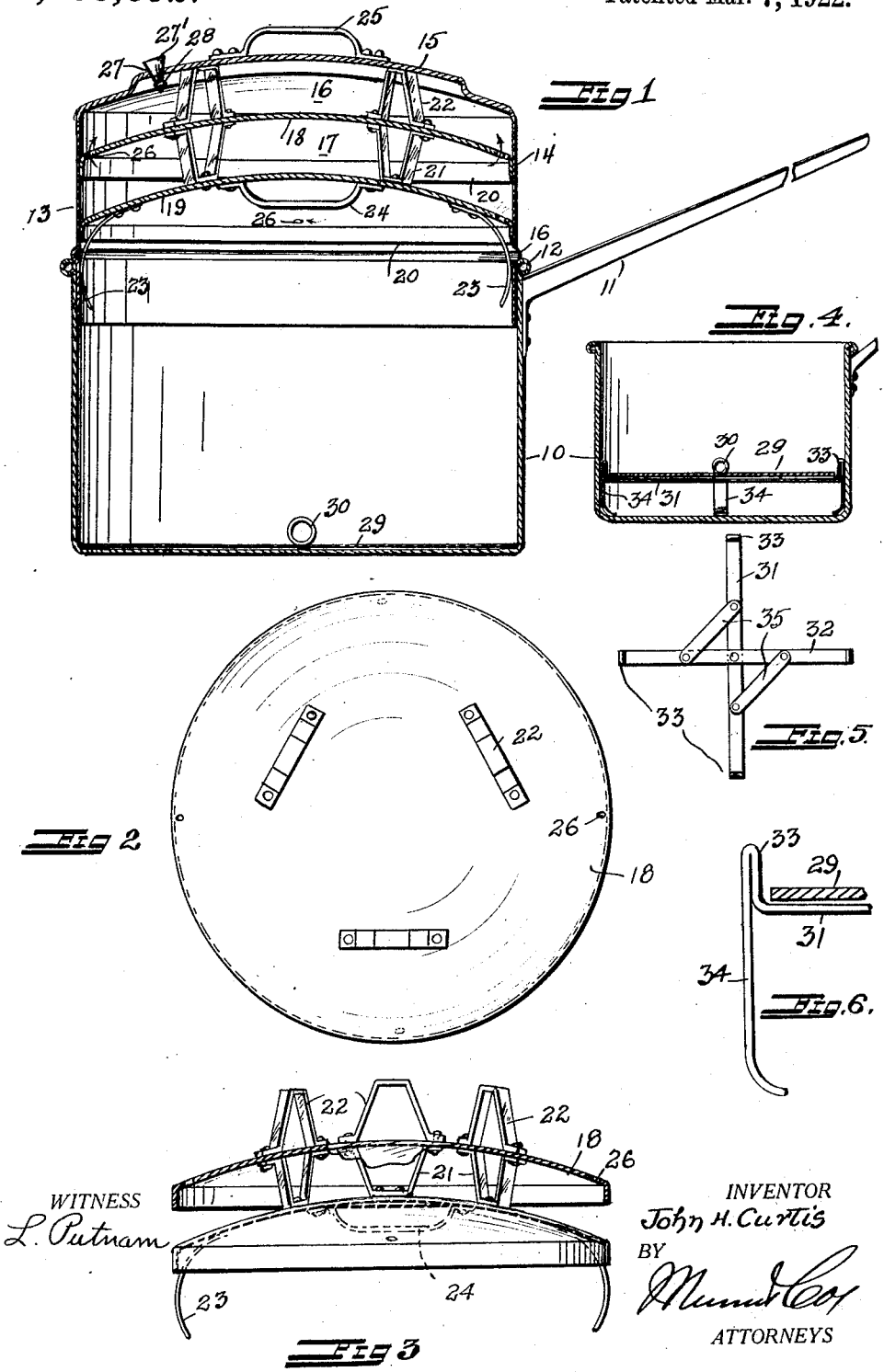

JOHN H. CURTIS, OF LONG BEACH, CALIFORNIA.

COOKING UTENSIL.

1,408,692. Specification of Letters Patent. Patented Mar. 7, 1922.

Application filed December 23, 1920. Serial No. 432,777.

*To all whom it may concern:*

Be it known that I, JOHN H. CURTIS, a citizen of the United States, and a resident of Long Beach, county of Los Angeles, and State of California, have invented a new and useful Cooking Utensil, of which the following is a specification.

This invention relates to a cooker and more particularly to a steam cooking utensil. The object of the invention is to provide a cooker which is adapted to maintain a relatively high cooking temperature when placed over a moderate supply of heat, and thus cook foods rapidly, efficiently, and economically.

It is also an object to provide a cooker in which the steam pressure will not exceed a predetermined degree, and in which the major portion of steam will be condensed and returned to the boiler portion of the cooker, thereby insuring that the initial water supply will suffice for a long cooking interval without replenishing.

A further object of the invention is that the parts be easily disassembled for cleaning and drying.

Other objects will later appear.

In carrying out the invention, an open top boiler or deep pan is provided for the reception of water and the food to be cooked. Upon the boiler there is fitted a relatively high lid, and within the lid there is positioned a pair of super-posed partition members, said members being secured to each other and freely removable as a unit. The partition members divide the interior of the lid into two compartments, and each partition is provided with a plurality of perforations to permit circulation of steam from the boiler into the two compartments and also permit any condensate formed by the steam to return to the boiler. In the top of the lid, a valve is mounted adapted to permit the escape of steam when the pressure within attains a predetermined degree. A false bottom for the boiler may also be utilized to prevent a direct heat against the food being cooked and thus avoid sticking or burning thereof. This is especially valuable when cooking rice or a like food which has a tendency to stick.

The invention is illustrated by way of example in the accompanying drawings, in which—

Figure 1 is a central, vertical sectional view of a cooker embodying my invention;

Figure 2 is a top plan view of the uppermost partition member;

Figure 3 is a side elevation, partly in section illustrating the partition members when assembled as a unit;

Figure 4 is a vertical sectional view of a cooker showing a support for a false bottom;

Figure 5 is a plan view of the false bottom support and

Figure 6 is a detail view in elevation of a leg for the support and showing a portion of the false bottom in section.

Referring to the drawings more particularly (10) indicates a boiler having a handle (11). The boiler is preferably of the shape shown and has formed about its upper edge an outwardly turned bead (12). A lid (13) is provided, comprising a cylindrical body portion (14) and a top (15). Near the lower end of the body portion (14) there is formed an annular bead (16). The lower end of the body portion (14) is adapted to telescope within the boiler and its bead (16) set upon the bead (12) of the boiler thus forming a tight closure.

The interior of the lid is divided into an upper compartment (16) and a lower compartment (17) by partition members (18) and (19) respectively. The partitions preferably have the curvature shown and each is provided with a downwardly extending flange (20), said flanges being adapted to make a tight sliding fit within the body portion (14) of the lid. The partition members are secured together by a plurality of substantially V-shaped members (21) and a plurality of similarly shaped members, as at (22), are secured to the top of partition member (18) to serve as spacing means between said partition and the top (15) of the lid. The partitions as a unit are freely slidable within the lid and are held in position by means of the bow-shaped springs (23). The springs as shown have their one end secured to the partition (19) and their lower bowed portion adapted to frictionally engage the body portion (14) of the lid. A handle (24) is secured to the partition (19) and a similar handle (25) secured to the top (15). By grasping these handles, one in each hand, the partitioning unit may be pushed into position or withdrawn as desired. Also, the handle (25) serves for lifting the lid and partitions as a whole, from the boiler.

Each partition is provided with a plurality of perforations (26); preferably two perforations for each partition, and arranged so that the perforations of one partition reside in a plane substantially at right angles to the plane in which the perforations of the other partition reside. This prevents a direct passage of steam from the boiler to the upper compartment of the lid and thus gives the steam a greater opportunity for condensing, and also allowing the condensate to return to the boiler.

In the top (15) of the lid there is provided an opening (27) adapted to receive and seat a conical shaped valve member (27'); said member being inverted as shown and provided with a cap (28) at its lower end to serve as a stop to hold the valve member from being blown entirely through the opening (27). The valve member may be of such a weight that it will require a certain pressure of steam from within to lift it and in this manner automatically regulate the pressure of steam within the boiler.

In the bottom of the boiler may be positioned a dish (29) with a ring (30) secured centrally thereof for lifting the same. As before stated, the dish serves as a false bottom for the boiler and is particularly useful when cooking rice or other foods which have a tendency to stick. This dish serves this purpose by preventing a direct heat upon the food being cooked. Also, the dish has a slight but continuous motion due to the boiling of the water which may collect therebeneath and in this manner continually frees itself from the food.

In operation, the boiler (10) is partly filled with water in which the food to be cooked is immersed. The partitioning unit is then placed within the lid and the lid fitted into the boiler. The boiler may now be set upon some artificial heating means and the cooking of the food will proceed. The steam from the boiler will pass into compartment (17) and from thence into compartment (16). The arrangement of the perforations in the partitions causes the steam to travel a circuitous path and for this reason the greater portion of the steam will be condensed, the condensate returning to the boiler and insuring that a relatively long cooking interval may be had without replenishing the boiler with water. No steam will escape about the valve member (27) until it has reached a predetermined pressure within the compartment (16) and in this manner a constant and comparatively high cooking temperature is maintained, also, as is obvious, a high and constant temperature may be maintained by the application of a moderate heat and thus cooking in an economical manner.

When the food has been cooked and it is desired to clean and dry the cooker, the partitioning unit may be easily removed for this purpose. This is a valuable feature as any rusting or collection of dirt or grease may be prevented. Also, the dish (29) may be easily removed, cleaned, and dried.

In using the device as a steamer, I prefer to support the dish or false bottom (29) above the cooker bottom in order that steam may freely pass around the same. As a support, I would prefer a metal or the like structure including two pieces or strips (31) and (32) each having a length of substantially that of the cooker's diameter and arranged crosswise to each other and riveted at their points of intersection. The respective ends of the strips will be upturned as at (33) and then bent upon themselves and presented downwardly to provide supporting feet (34). The upturned ends (33) provide a ledge for confining the dish or false bottom (29) in place, so that it will not abut against the side walls of the cooker and prevent the steam from rising around all sides of the dish or bottom.

The support is suitably braced by the connecting links (35).

Claims:

1. A cooking utensil including in combination, a boiler, a lid forming a tight closure therefor, said lid comprising a body portion and a top, partitions for dividing the interior of the lid into two compartments, one above the other, each partition being provided with a plurality of perforations, and a valve member in the top of the lid adapted to automatically regulate the steam pressure within the top compartment of the lid.

2. A cooking utensil including in combination, a boiler, a lid forming a tight closure therefor, said lid comprising a body portion and a top, a pair of partitions for dividing the interior of the lid into two compartments, one above the other, and each partition having two perforations, the perforations of one partition being disposed in a plane at right angles to the plane in which the perforations of the other partition are disposed, and a valve in the top of the lid adapted to automatically regulate the pressure within the upper compartment of the lid.

3. A cooking utensil including in combination, a boiler, a lid forming a tight closure therefor, said lid comprising a body portion and a top, partitions for dividing the interior of the lid into two compartments, one above the other, each partition being provided with a plurality of perforations, and a valve member in the top of the lid adapted to automatically regulate the steam pressure within the top compartment of the lid, said valve comprising an inverted cone-shaped valve member inserted within an opening provided in the top of the lid, said opening being adapted to seat the valve member and hold the same with a portion projecting into the lid, and a cap on the lower end of the valve member adapted to act as a stop against the valve member being blown from the opening.

4. A cooking utensil including in combination, a boiler, a lid forming a tight closure therefor, said lid comprising a body portion and a top, a pair of partitions for dividing the interior of the lid into two compartments, one above the other, said partitions being secured together and freely removable as a unit, and each partition having a plurality of perforations to establish communications between the boiler and each compartment, and a valve in the top of the lid adapted to automatically regulate the steam pressure within the upper compartment.

5. In a device of the character described, a lid comprising a body portion and a top formed therewith, a pair of perforated partition members within the lid adapted to divide the interior thereof into an upper compartment and a lower compartment, and valve means in the top of the lid adapted to automatically regulate steam pressure within the upper compartment of the lid.

6. In a device of the character described, a lid comprising in combination a body portion and a top formed therewith, a pair of perforated partition members slidable within the lid and adapted to divide the interior thereof into an upper compartment and a lower compartment, means for securing said partition members to one another whereby they may be removed as a unit, and a valve in the top of the lid adapted to automatically regulate the escape of steam from said lid.

7. In a device of the character described, a lid comprising in combination a body portion and a top formed therewith, a pair of perforated partition members slidable within the lid and adapted to divide the interior thereof into an upper compartment and a lower compartment, means for securing said partition members to one another whereby they may be removed as a unit, spring means for yieldably holding said partitions in position, and a valve in the top of the lid adapted to automatically regulate the escape of steam from said lid.

8. In a device of the character described, a lid, comprising in combination a body portion having a top formed therewith, a pair of super-posed perforated partitions slidable within the body portion, spacing members between the partitions and the lid top, said spacing members being secured to the partitions only to form a unit therewith which is freely slidable from the lid, and a valve in the top of lid adapted to permit the escape of steam when a predetermined pressure is attained within the lid.

9. In a device of the character described, a lid, comprising in combination a body portion having a top formed therewith, a pair of super-posed perforated partitions slidable within the body portion, spacing members between the partitions and the lid top, said spacing members being secured to the partitions only to form a unit therewith which is freely slidable from the lid, a handle for the lower partition and for the top of lid whereby the partitioning unit may be withdrawn or positioned, and a valve in the top of lid adapted to permit the escape of steam when a predetermined pressure is attained within the lid.

JOHN H. CURTIS.